(12) United States Patent
Chamot et al.

(10) Patent No.: US 6,378,776 B1
(45) Date of Patent: Apr. 30, 2002

(54) FAST-RESPONSE THERMOSTATIC ELEMENT

(75) Inventors: Jean Chamot, Arpajon; Claude Henault, St Forget les Sablons, both of (FR)

(73) Assignee: Vernet S.A., Arpajon Cedex (FR)

( * ) Notice: Subject to any disclaimer, the term of this patent is extended or adjusted under 35 U.S.C. 154(b) by 0 days.

(21) Appl. No.: 09/496,662

(22) Filed: Feb. 3, 2000

(51) Int. Cl.$^7$ ................................................ G05D 23/12
(52) U.S. Cl. ........................................ 236/100; 60/527
(58) Field of Search .............................. 236/99 K, 100, 236/34, 34.5; 60/527; 374/193, 208, 160; 337/393

(56) References Cited

U.S. PATENT DOCUMENTS

| | | | | |
|---|---|---|---|---|
| 3,234,793 A | * | 2/1966 | Vernet | 236/34 |
| 3,330,480 A | * | 7/1967 | Drapeau et al. | 236/100 |
| 3,395,580 A | * | 8/1968 | Kuze | 236/100 |
| 4,346,837 A | * | 8/1982 | Inagaki et al. | 236/100 |
| 4,349,281 A | | 9/1982 | Onksen et al. | 374/136 |
| 5,294,046 A | * | 3/1994 | Fishman | 236/34.5 |

FOREIGN PATENT DOCUMENTS

| | | |
|---|---|---|
| EP | 0 153 555 | 9/1985 |
| EP | 0 783 096 | 7/1997 |
| WO | 97/23740 | 7/1997 |

* cited by examiner

*Primary Examiner*—William E. Tapolcai
(74) *Attorney, Agent, or Firm*—Wenderoth, Lind & Ponack, L.L.P.

(57) ABSTRACT

A thermostatic element includes an elongated cap, containing a material expandable and contractible as a function of the direction of variation of its temperature. A piston moveable in the longitudinal direction of the cap is coupled to the expandable and contractible material so as to be displaced in opposite directions, depending on whether the material expands or contracts. The side wall of the cap has flats or depressions around the cap and which extend in the longitudinal direction of the cap and which delimit an inner space. The cross section of the inner space, the length over which the flats or depressions extend, has a lobed shape, and an insert accommodated and fixed in the cap extends in the longitudinal direction of the latter.

20 Claims, 2 Drawing Sheets

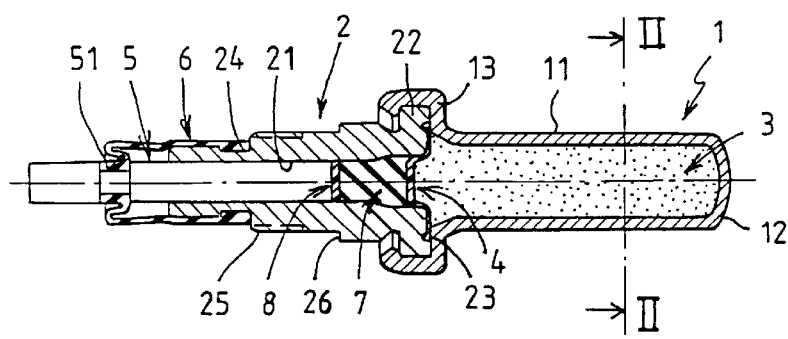
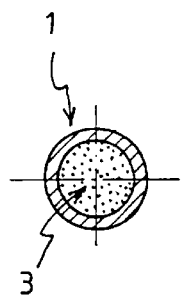
FIG.1  FIG.2
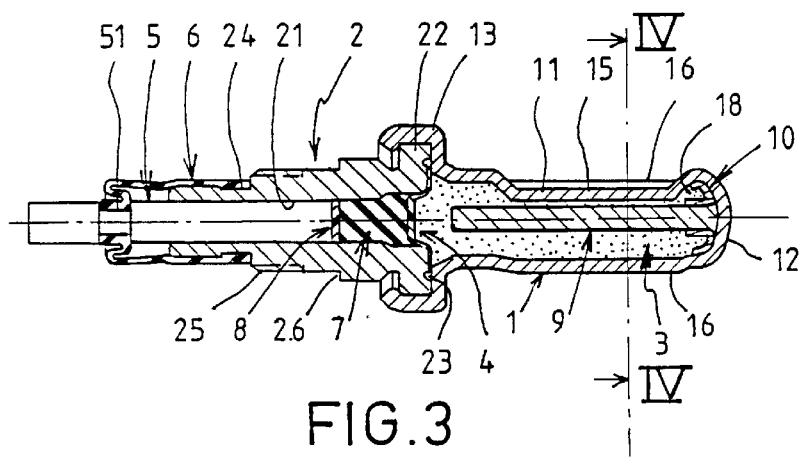
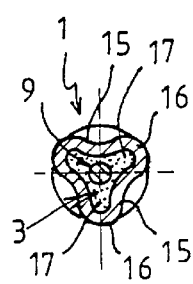
FIG.3  FIG.4
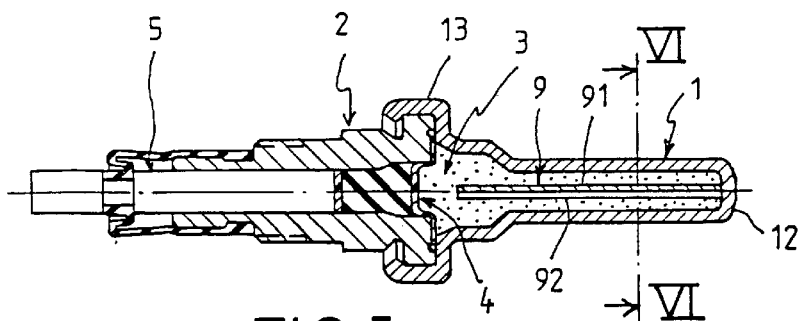
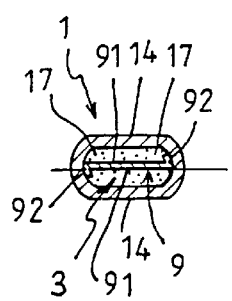
FIG.5  FIG.6

FAST-RESPONSE THERMOSTATIC ELEMENT

BACKGROUND OF THE INVENTION

1. Field of the Invention

The invention relates to a thermostatic element of the type comprising a cap an elongated shape, and which contains a material substantially expandable and contractible as a function of the direction of variation of its temperature. A piston moveable relative to the cap in the longitudinal direction of the cap is coupled to the expandable and contractible material so as to be displaced in opposite directions, depending on whether the material expands or contracts.

Such thermostatic elements are used, in particular, in the field of setting the temperature of a fluid obtained from the mixture of two fluid streams at different temperatures. The relative movement of the piston and cap is employed in order to change the proportion of the mixture of the two fluid streams.

For a large number of applications in this field, it is necessary for the response of the thermostatic element to be very fast. In other words, the change in the temperature of the medium in which the cap is located gives rise in a very short time to a corresponding movement of the piston. This is particularly true of thermostatic elements immersed in a stream of water feeding a sanitary installation, in which application, when an ideal temperature has been selected, a fall in temperature of three of only four degrees is very unpleasant and an increase of a few degrees may cause burns.

2. Description of the Prior Art

The thermostatic elements used conventionally in this type of application comprise, for example, according to FIGS. 1 and 2, a metallic cap 1 possessing a part 11 which has a cylindrical general shape of circular cross section and a bottom end 12 which is closed. The opposite end of cap 1 widens and is connected to a collar 13, and a sleeve 2 having a shape of revolution with a central duct 21 and a base 22 is accommodated in the collar of the cap in such a way that, with the exception of the base 22, the sleeve 2 extends out of the cap in the opposite direction to the cylindrical part 11 of the cap so as to be coaxial with the cap. The collar 13 is crimped around the base 22.

The cylindrical part 11 of the cap is filled with a mass of material, such as wax mass 3, which is highly expandable and contractible as a function of the variations in temperature, particularly variations around the usual ambient temperature. The base 22 of the sleeve comprises, in its face confronting this wax mass, an annular receptacle 23 in which is anchored the periphery of a disk-shaped and elastically deformable diaphragm 4 shutting off the central duct 21 of the sleeve on the same side as the cap 1. Inside the duct 21 of the sleeve is accommodated a piston 5 subjected to the movements of the central region of the diaphragm. The end of this piston which is opposite the diaphragm projecting out of the sleeve to a greater or lesser extent as a function of the volume occupied by the wax and, therefore, as a function of the temperature of the wax. A protective tubular part hood or concertina 6 surrounds part of the sleeve 2 and part of the piston 5, the ends of the hood or concertina being immobilized in grooves 24, 51 made in the perimeter of these two components. This hood or concertina 6, in the form of a flexible unwinding or rolling membrane, follows the movements of the piston without any elastic deformation. The piston 5 is subjected to the movements of the central region of the diaphragm 4 by a plug 7 made of deformable elastomer, in contact against that surface of the diaphragm which is opposite the wax mass, and by of a washer 8 made of polymer, such as PTFE, inserted between the plug and the piston and fitted into the duct 21 in order to prevent the elastomer of the plug from creeping around the piston.

For the purpose of fixing the thermostatic element in a thermostat, its sleeve 2 has a threaded region 25, designed for receiving, for example, a nut, and a shoulder 26 such that a supporting piece can be gripped between the shoulder and the nut, if appropriate, with a nut locking device being interposed.

The general design of these thermoplastic elements is highly suited to the use of a wax, the coefficient of expansion of which is very high in relation to that of common fluids (about 10 to 20 times higher) and is therefore capable of causing a very pronounced movement of the piston. Unfortunately, these waxes have very low thermal conductivity (about 1000 times lower than that of copper), and therefore the temperature of the wax mass as a whole reflects only inadequately, and with a long delay, the temperature of the fluid in which the cap is immersed. For this reason, the wax is usually "loaded" with a powder consisting of a material having high thermal conductivity, for example a copper powder of suitable grain size. For the sake of simplification, "wax" will designate hereafter both loaded materials and nonloaded materials and also single-component waxes. However, all these expedients are insufficient for obtaining a fast-response thermostatic element capable of being used without any special precaution in a sanitary installation.

The object of the invention is to overcome this disadvantage and to provide a fast-response thermostatic element, the manufacture of which is simple and not appreciably more complicated than that of the known thermostatic elements and which has a high degree of reliability.

SUMMARY OF INVENTION

To achieve this, the invention relates to a thermostatic element of the type comprising a cap having an elongated shape, containing a displacement material substantially expandable and contractible as a function of the direction of variation of its temperature. A piston moveable relative to the cap in the longitudinal direction of the cap is coupled to the expandable and contractible material so as to be displaced in opposite directions, depending on whether the material expands or contracts. The thermostatic element is defined in that the side wall of the cap has flats or depressions (dents) around the cap which extend in the longitudinal direction of the cap and which delimit an inner space. The cross section of the cap, over which the flats or depressions extend, has a lobed shape, and an insert accommodated and fixed in the cap extends in the longitudinal direction of the cap.

Due to the fact that the side wall of the cap of the thermostatic element comprises dents such as flats or depressions resulting in lobes, as seen in cross section, the entire inner space of the cap is close to a plurality of regions of the side wall, with the exception of the central region of the cap. However, due to a suitable positioning of the insert in the cap, the quantity of wax or the like contained in this central region may be small and the greatest part of this material may be located in the lobes, thus allowing the variations in temperature of the medium outside the thermostatic element to be transmitted quickly to the entire mass of material contained in the cap. Moreover, the total quantity of material having low thermal conductivity is substantially smaller.

The thermostatic element according to the invention may, furthermore, have one or more of the following characteristics. The insert may consist of a material of high thermal conductivity. The insert may consist of a material of markedly lower thermal conductivity than that of the expandable and contractible material. The side wall of the cap may have three flats or depressions delimiting a cap inner space, the cross section of which has three lobes. The side wall of the cap may have two flats or depressions delimiting a cap inner space, the cross section of which has two lobes extending in opposite directions. The side wall of the cap may have more than three flats or depressions delimiting a cap inner space, the cross section of which has more than three lobes. The insert may have a cylindrical general shape, may consist of a plate, may consist of a folded plate comprising two parallel tabs, may have one end provided with fins, and may be welded to the side wall of the cap. The cap may comprise a bottom region having cavities. The insert may be welded to a washer, itself welded to the cap, or may comprise fins accommodated in cavities of the cap.

BRIEF DESCRIPTION OF THE DRAWINGS

Other characteristics and advantages of the invention maybe gathered from the following description of embodiments of the invention which are described by way of nonlimiting examples, the description being made with reference to the accompanying drawings in which:

FIG. 1 is a longitudinal section through the known thermostatic element which was described above, FIG. 2 is a cross section through the thermostatic element of FIG. 1 along the line 11—11 of this figure, FIG. 3 is a longitudinal section through a first embodiment of a thermostatic element according to the invention;

FIG. 4 is a cross section through the thermostatic element of FIG. 3 along the line IV—IV of this figure, FIG. 5 is a longitudinal section through a second embodiment of a thermostatic element according to the invention, FIG. 6 is a cross section through the thermostatic element of FIG. 5 along the line VI—VI of this figure.

DETAILED DESCRIPTION OF THE PREFERRED EMBODIMENTS

Figure 9:
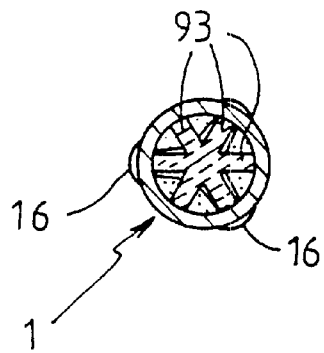
FIGS. 8 and 9 are cross sections through the thermostatic element of FIG. 7 respectively along the lines VIII—VIII and IX—IX of this figure.

Since the known thermostatic element of FIGS. 1 and 2 was described above, it will not be described again, and those members of the thermostatic elements according to the invention which correspond to members of the known element bear the same reference numerals.

Like the known thermostatic element, the thermostatic elements according to the invention which are illustrated in FIGS. 3 to 9 comprise a metallic cap 1 possessing a part 11 of cap 1 which has an elongated shape filled with a mass of essentially expandable and retractible displacement material 3, such as wax, and a bottom end 12 which is closed. The opposite end widens and is connected to a collar 13, and a sleeve 2 having a circular shape with a central duct 21 and a base 22 is accommodated in the collar of the cap. The collar 13 is crimped around the base 22, and the cap and the sleeve extend coaxially in opposite directions.

Likewise, the base 22 of the sleeve comprises, in its face confronting the mass of wax, an annular receptacle 23 in which is anchored the periphery of a disk-shaped and elastically deformable diaphragm 4 shutting off the duct 21 on the same side as the cap. Inside the sleeve is a piston 5 subjected to the movement of the central region of the diaphragm. The end of the piston which is opposite the diaphragm projects out of the sleeve to a greater or lesser extent as a function of the volume occupied by the wax and, therefore, as a function of the max temperature. There is also a protective tubular hood or concertina 6 surrounding part of the sleeve 2 and the piston 5, and the ends of the hood or concertina are immobilized in grooves 24, 51 made in the perimeter of these two components. The hood or concertina, in the form of a flexible unwinding or rolling membrane, follows the movements of the piston without any elastic deformation. The piston 5 is, in turn, subjected to the movements of the central region of the diaphragm 4 by a plug 7 consisting of a deformable elastomer, in, contact against that surface of the diaphragm which is opposite the wax mass, and by a washer 8 consisting of polymer, such as PTFE, inserted between the plug and the piston and fitted into the duct 21.

The sleeve 2 has a threaded region 25 for receiving a fixing nut, and a stop shoulder 26.

Contrary to the known thermostatic elements, the perimeter of the cap 2 has flats 14 (FIGS. 5 and 6) or a succession of depressions 15 (FIGS. 3, 4, 7, 8, 9) defining between them regions in relief 16 (lobe regions) which extend longitudinally from the vicinity of the bottom 12 of cap 1 as far as the vicinity of the collar 13. As shown in the cross-sectional views of FIGS. 4 and 6, the flats or depressions are evenly spaced around the periphery of the cap 1. These flats or depressions and lobe regions, which succeed one another around or over the perimeter of the cap, because of the approximately constant thickness of the wall of the latter, delimit an inner space. The cross section of this inner space, taken in a plane perpendicular to the longitudinal axis of the piston 5 and thus to the direction in which the piston and cap extend, has a lobed shape. This lobed shape extends over the entire length over which the flats 14 or depressions 15 and lobe regions 16 extend.

Furthermore, likewise according to the invention, the cap contains an insert 9 fastened to its inner surface and extending from its bottom 12 as far as the vicinity of its collar 13.

Preferably, the cap, sleeve and piston consist of metal of high thermal conductivity. For example, for mechanical reasons, the cap consists of copper, while the sleeve and piston consist of brass.

FIGS. 3 and 4 show a thermostatic element, in which the side wall of the cap 13 has three depressions 15 which two by two delimit three lobe regions 16, in such a way that, as seen in cross section, three lobes 17 distributed at 120° are defined.

The insert 9 accommodated in the cap is, here, a component consisting of a metal of high thermal conductivity, such as a cylindrical copper rod which extends along the axis of the piston 5. One end of the insert 9 is welded directly in the bottom of the cap and/or to a ring 10, itself welded to the bottom of the cap, while the other end overhangs in the vicinity of the collar. The very short distance separating the insert from the side wall of the cap will be seen.

Preferably, the depressions 15 are produced by the deformation of the perimeter of the cap, initially of cylindrical general shape, as in FIGS. 1 and 2 over only a part of its length extending between its bottom and its collar. In this way, the region of the bottom 12 of the cap has three cavities 18 distributed at 120° and preserves an approximately circular cross section, in which the possible fastening ring 10 extends.

FIGS. 5 and 6 show a thermostatic element, in which the side wall of the cap 1 has two parallel flats 14 such that, as seen in cross section, two lobes 17 extending in opposite directions are defined.

Here, the insert 9 accommodated in the cap may be a substantially planar plate oriented in a plane extending diametrically along the piston 5 in parallel with the two flats 14. At an equal distance between the flats, the plate is welded laterally, for example, with its edges to the side wall of the cap. One of its ends bears against the bottom of the cap and the other is free in the vicinity of the collar 13. Alternatively, as in the figures, the plate may be folded in an approximately Z-shaped manner, so as to define a large wing on either side of the faces 91, two tabs 92 perpendicular to this wing extending parallel to one another. In this embodiment, the tabs 92 are welded to the side wall of the cap. Here too, one of the ends, thus formed, of the plate forming an insert 9 bears against the bottom 12, and the other is in the vicinity of the collar 13.

In this embodiment, as in that of FIGS. 3 and 4, the insert 9 is metallic such as copper or a copper alloy, or, in general terms, a material of high thermal conductivity. Therefore, on the one hand, it replaces in the volume of the cap a quantity of wax of low conductivity and, on the other hand, it contributes to the rapid and homogeneous distribution of heat over the entire surface of the wax mass which is in contact with it.

However, it is also possible to produce the insert from a material of very low thermal conductivity. Thus, the quantity of wax in the cap is reduced and, furthermore, the heat energy transmitted to the cap is for the most part transmitted to the wax mass, the thermal conductivity of which is markedly higher than that of the insert which thus has high thermal inertia.

Figure 7:
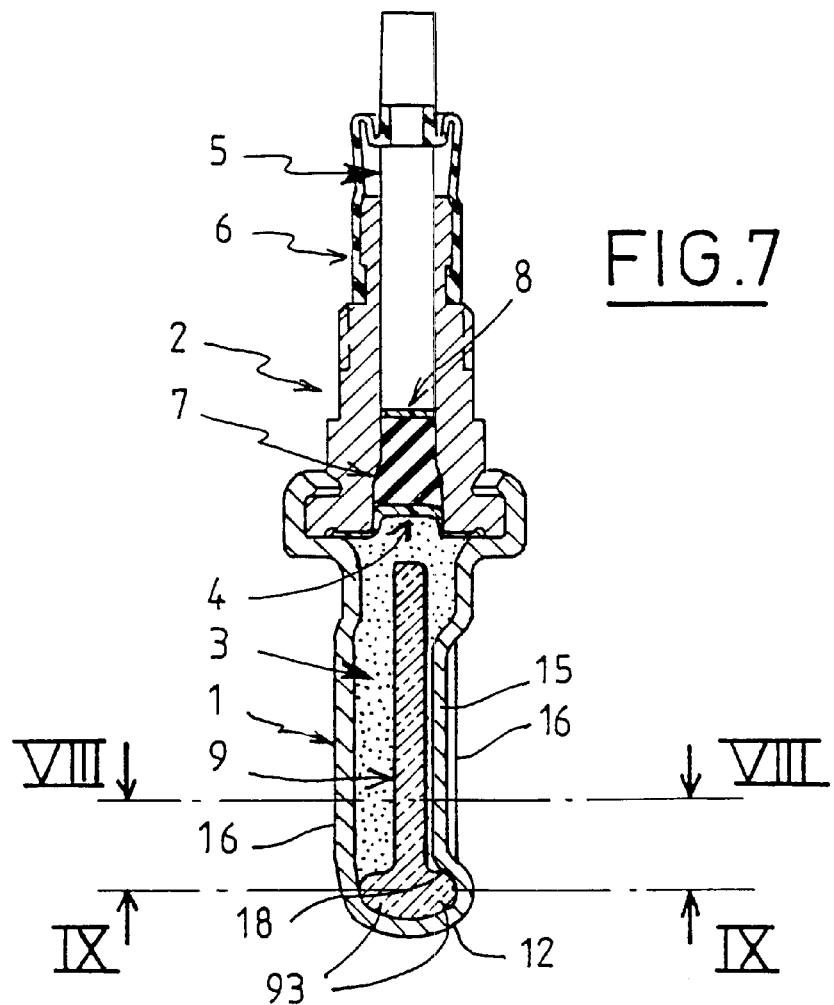
FIG. 7 is a longitudinal section through a third embodiment of a thermostatic element according to the invention.
Figure 8:
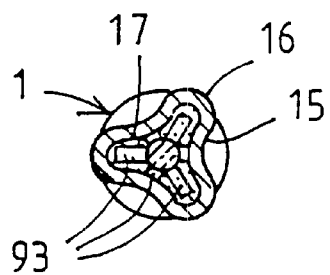

An embodiment highly suited to receiving a thermally insulating insert is illustrated in FIGS. 7 to 9, where the thermostatic element comprises a cap 1 identical to that of the thermostatic element of FIGS. 3 and 4.

In this embodiment, the insert 9 is an elongated component consisting of a material of very low thermal conductivity, cylindrical over the greatest part of its length as far as its free end in the vicinity of the collar. At its opposite end, the insert 9 has fins 93 extending radially and resulting, as seen in a cross section through the insert, in a star shape.

As in the embodiment of FIGS. 3 and 4, the cylindrical part of the insert 9 extends along the same axis as the piston 5. Preferably, the insert comprises six fins 93 in the case of a cap 1 with three depressions 15 and three lobe regions 16, so that three fins can be oriented in the axis of the lobes 17 and three others are held in the three cavities 18, even in the absence of other means for fastening the insert in the cap.

In all these embodiments, the lobed shape and the presence of the insert 9 result in a response time of the thermostatic element which is much shorter than that of the prior thermostatic elements and, in particular, of the element of FIGS. 1 and 2.

A movement of the piston 5 in the sleeve 2 was referred to in all the foregoing. However, in practical applications, it is not necessary for the cap and the sleeve to be held fixedly and for the piston to be actually moveable. In some applications, the piston 5 is held fixedly, while the sleeve 2 and the cap 1 are moveable, the movements referred to being relative movements.

Typically, in the embodiments with more than two lobes, in that part of the cap in which the flats or depressions extend, the lobes extend, as seen in cross section, from a circular space having a diameter of the order of 2.5 to 3 mm, and the circle circumscribed on the outer surface of the cap has a diameter of 8 to 9 mm.

However, the invention is not, of course, limited to the embodiments described and illustrated above, and other variations may be provided without departing from its scope. In particular, it is possible to provide embodiments having different dimensions suitable for the specific application of the product and highly diverse forms of the insert 9, and also caps having more than two or three flats 14 or depressions 15 and therefore a cross section with more than two or three lobes 17.

What is claimed is:

1. A thermostatic element comprising:
    an elongated cap including a side wall having a constant wall thickness, and including a plurality of dents formed around a periphery of said side wall of constant wall thickness so as to form a plurality of cross-sectional lobe regions in an interior of said cap, each of said dents extending in a longitudinal direction of said cap;
    an elongated insert in said cap and arranged so as to extend in the longitudinal direction of said cap;
    a displacement material in said cap, said displacement material being operable to expand and contract as a function of temperature; and
    a piston coupled to said displacement material so as to be movable relative to said cap according to an expansion and contraction of said displacement material.

2. The thermal element of claim 1, wherein said dents comprise one of flats and depressions formed around said periphery of said side wall.

3. The thermal element of claim 2, wherein said one of flats and depressions are evenly spaced around said periphery of said side wall.

4. The thermal element of claim 1, wherein said dents are evenly spaced around said periphery of said side wall.

5. The thermal element of claim 1, wherein said insert comprises a thermally-conductive material.

6. The thermal element of claim 1, wherein said plurality of dents comprises three dents formed around a periphery of said side wall so as to form three cross-sectional lobe regions.

7. The thermal element of claim 6, wherein said three dents are evenly spaced around said periphery of said side wall.

8. The thermal element of claim 6, wherein said dents comprise one of flats and depressions formed around said periphery of said side wall.

9. The thermal element of claim 1, wherein said insert is cylindrically-shaped.

10. The thermal element of claim 1, wherein said cap includes an open end and a closed end, said closed end having cavities formed therein.

11. The thermal element of claim 1, further comprising a washer welded to said cap, said insert being welded to said washer.

12. A thermostatic element comprising:
    an elongated cap including a side wall and having a plurality of dents formed around a periphery of said side wall so as to form a plurality of cross-sectional lobe regions in an interior of said cap, each of said dents extending in a longitudinal direction of said cap;
    an elongated insert in said cap and arranged so as to extend in the longitudinal direction of said cap;

a displacement material in said cap, said displacement material being operable to expand and contract as a function of temperature;

a piston coupled to said displacement material so as to be movable relative to said cap according to an expansion and contraction of said displacement material; and a washer welded to said cap, said insert being welded to said washer.

13. The thermal element of claim 12, wherein said dents comprise one of flats and depressions formed around said periphery of said side wall.

14. The thermal element of claim 13, wherein said one of flats and depressions are evenly spaced around said periphery of said side wall.

15. The thermal element of claim 12, wherein said dents are evenly spaced around said periphery of said side wall.

16. The thermal element of claim 12, wherein said insert comprises a thermally-conductive material.

17. The thermal element of claim 12, wherein said plurality of dents comprises three dents formed around a periphery of said side wall so as to form three cross-sectional lobe regions.

18. The thermal element of claim 17, wherein said three dents are evenly spaced around said periphery of said side wall.

19. The thermal element of claim 17, wherein said dents comprise one of flats and depressions formed around said periphery of said side wall.

20. The thermal element of claim 12, wherein said cap includes an open end and a closed end, said closed end having cavities formed therein.

* * * * *